(12) United States Patent
Ko

(10) Patent No.: US 8,456,761 B2
(45) Date of Patent: Jun. 4, 2013

(54) LENS SYSTEM

(75) Inventor: Chun-Cheng Ko, New Taipei (TW)

(73) Assignee: Wcube Co.,Ltd., George Town (KY)

( * ) Notice: Subject to any disclaimer, the term of this patent is extended or adjusted under 35 U.S.C. 154(b) by 0 days.

(21) Appl. No.: 13/426,612

(22) Filed: Mar. 22, 2012

(65) Prior Publication Data

US 2013/0094099 A1   Apr. 18, 2013

(30) Foreign Application Priority Data

Oct. 14, 2011   (TW) .................................. 100137214

(51) Int. Cl.
  *G02B 3/02*   (2006.01)
  *G02B 13/04*   (2006.01)

(52) U.S. Cl.
  USPC ........... 359/716; 359/740; 359/749; 359/753; 359/784

(58) Field of Classification Search
  USPC ...................... 359/716, 740, 749, 753, 784
  See application file for complete search history.

(56) References Cited

U.S. PATENT DOCUMENTS 7,436,605 B2 * 10/2008 Asami ........................... 359/784

* cited by examiner

*Primary Examiner* — Evelyn A. Lester
(74) *Attorney, Agent, or Firm* — Altis Law Group, Inc.

(57) ABSTRACT

A lens system includes a first lens with negative refraction power, and a second lens with positive refraction power. The first lens includes a surface facing the image side having an optical portion. The lens system satisfies the formulas: (1) Y/Z<1.10;(2) G1R1/F1<−3.10; and (3) G2R2/F2>1.49, wherein Y is a distance between an end point of the optical portion and a center point of the optical portion along a direction perpendicular an optical axis, Z is a distance between the end point of the optical portion and the center point of the optical portion along the optical axis, F1 and F2 are the focal lengths of the first and second lenses, respectively, G1R1 and G2R2 respectively denote the radius of curvatures of a surface of the first lens facing the object side and another surface of the second lens facing the image side.

9 Claims, 11 Drawing Sheets

LENS SYSTEM

BACKGROUND

1. Technical Field

The present disclosure relates to lens systems and, particularly, to a lens system with a high resolution.

2. Description of Related Art

Short overall length is demanded of lens modules for image acquisition, when the lens modules are mounted in relatively thin equipment, such as simple digital cameras, webcams for personal computers, and portable imaging systems in general. In order to satisfy this demand for a compact lens system, many lens systems have a reduced number of lenses to shorten the overall length, but this will decrease the resolution. Increasing the number of lenses can increase resolution, but will also increase the overall length of the lens systems.

What is needed, therefore, is a lens system to overcome the above-described problem.

DETAILED DESCRIPTION

Embodiments will be described with reference to the accompanying drawings.

Figure 1:
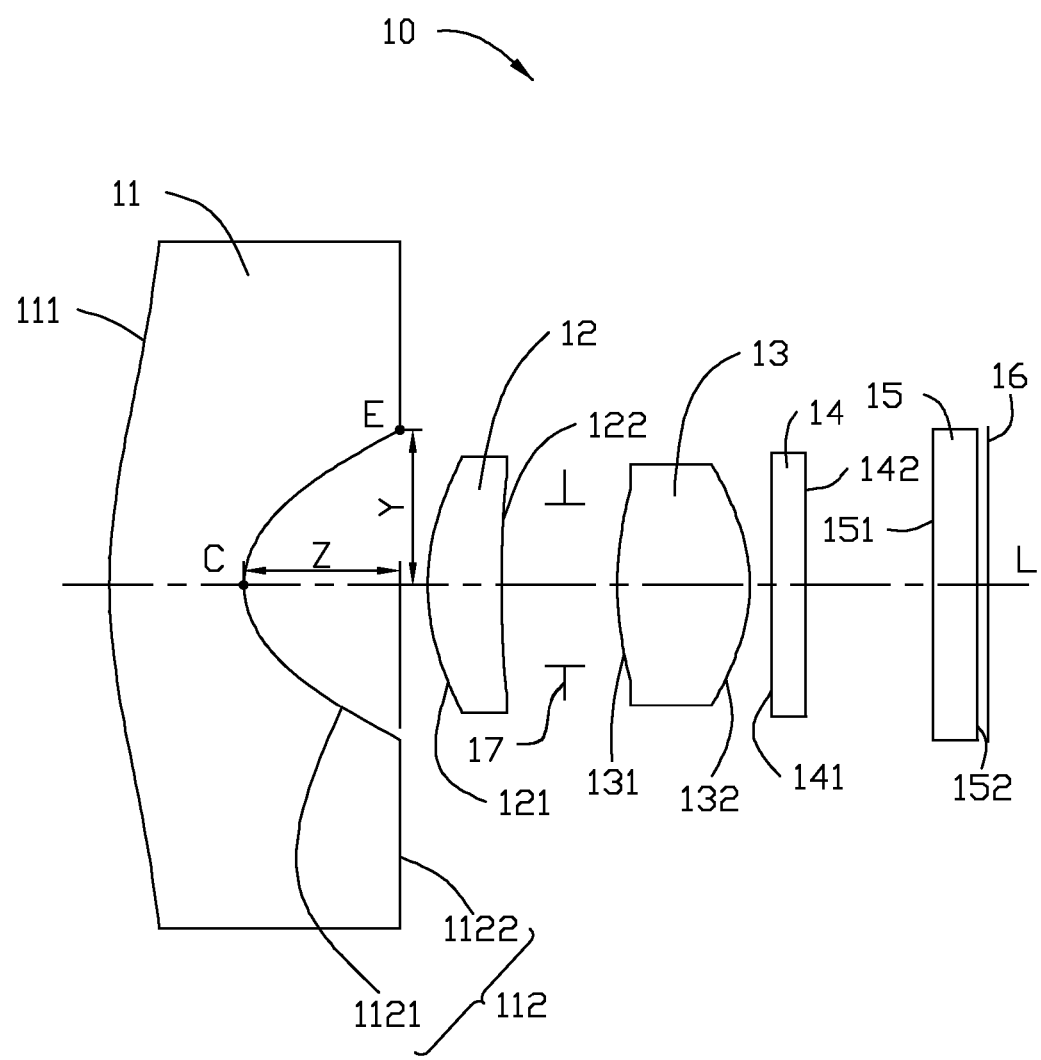
FIG. 1 is a schematic view of a lens system in accordance with a first exemplary embodiment.

Referring to FIG. 1, a lens system 10, according to a first exemplary embodiment, optically captures an image of an object at an object side and forms a corresponding image at an image side. The lens system 10 includes, in the order from the object side to the image side, a first lens 11 with negative refraction power, a second lens 12 with positive refraction power, an aperture 17, a third lens 13 with positive refraction power, an infrared band-pass filter 14, a glass plate 15, and an image plane 16. The lens system 10 can be used in digital cameras, mobile phones, personal computer cameras and so on. The lens system 10 can be used for capturing images by disposing an image sensor at the image plane 16 of the lens system 10.

The first lens 11 includes a first surface 111 facing the object side, and a second surface 112 facing the image side. The radius of curvature of the first surface 111 is denoted as "G1R1". The radius of curvature of the second surface 112 is denoted as "G1R2". The second surface 112 includes an optical portion 1121 and a non-optical portion 1122 surrounding the optical portion 1121.

The second lens 12 includes a third surface 121 facing the object side and a fourth surface 122 facing the image side. The radius of curvature of the third surface 121 is denoted as "G2R1". The radius of curvature of the fourth surface 122 is denoted as "G2R2".

The third lens 13 includes a fifth surface 131 facing the object side and a sixth surface 132 facing the image side. The radius of curvature of the fifth surface 131 is denoted as "G3R1". The radius of curvature of the sixth surface 132 is denoted as "G3R2".

The infrared band-pass filter 14 includes a seventh surface 141 facing the object side and a eighth surface 142 facing the image side.

The glass plate 15 includes a ninth surface 151 facing the object side and a tenth surface 152 facing the image side.

In order for the lens system 10 have a large aperture, a high resolution, and high relative illumination, the lens system 10 satisfies the formulas:

$$Y/Z < 1.10; \quad (1)$$

$$G1R1/F1 < -3.10; \text{ and} \quad (2)$$

$$G2R2/F2 > 1.49. \quad (3)$$

wherein Y is a distance between an end point E of the optical surface 1121 and a center point C of the optical surface 1121 along a direction perpendicular an optical axis L, Z is a distance between the end point E of the optical portion 1121 and the center point C of the optical portion 1121 along the optical axis L, F1 is the focal length of the first lens 11, and F2 is the focal length of the second lens 12.

Formula (1) is for ensuring the lens system 10 has high relative illumination when the lens system 10 has a large aperture and a wide angle.

Formula (2) is for decreasing the refraction power of the first lens 11, and then lessening the core shift sensitivity of the lens system 10.

Formula (3) is for ensuring the lens system 10 has a high resolution.

In order to ensure the image quality of the lens system 10 satisfies the above formulas (1)-(3), the lens system 10 further satisfies the following conditions: G1R2/F1>−0.60, G1R2/F1>G1R1/F1, G3R1/F3>1.14, and G3R2/F3<−0.68. F3 is the focal length of the third lens 13.

In order to better eliminate image aberration, the first lens 11, the second lens 12, and the third lens 13 further satisfy the following conditions: Vd1=Vd2=Vd3<33, wherein Vd1 is the Abbe number of the first lens 11, Vd2 is the Abbe number of the second lens 12, and Vd3 is the Abbe number of the third lens 13.

The first lens 11, the second lens 12, and the third lens 13 are aspherical lenses, and the aspherical surfaces of the first lens 11, the second lens 12, and the third lens 13 are shaped according to the formula:

$$x = \frac{ch^2}{1 + \sqrt{1 - (k+1)c^2 h^2}} + \sum A_i h^i$$

wherein h is a height from the optical axis of the lens system 10 to a point of the aspherical surface, c is a vertex curvature, k is a conic constant, and $A_i$ are i-th order correction coefficients of the aspherical surfaces.

The following symbols are used:
R: radius of curvature,
D: distance between surfaces on the optical axis,
Nd: refractive index,
Vd: Abbe number, The lens system 10 of the first exemplary embodiment satisfies the parameters of Tables 1-3. The effective focal length of the lens system 10 is 1.02 mm, the viewing angle of the lens system 10 is 124.01 degrees, and the aperture of the lens system 10 is 2.07.

TABLE 1

| surface | type | R(mm) | D(mm) | Nd | Vd |
|---|---|---|---|---|---|
| object surface | flat | infinity | 111.8 | — | — |
| first surface 111 | aspherical | 5.28 | 1.22 | 1.58 | 29.9 |
| second surface 112 | aspherical | 0.73 | 1.67 | — | — |
| Third surface 121 | aspherical | 2.02 | 0.67 | 1.58 | 29.9 |
| fourth surface 122 | aspherical | 15.92 | 0.72 | — | — |
| aperture 17 | flat | infinity | 0.33 | — | — |
| fifth surface 131 | aspherical | 2.88 | 1.20 | 1.58 | 29.9 |
| sixth surface 132 | aspherical | −1.53 | 0.20 | — | — |
| seventh surface 141 | flat | infinity | 0.30 | 1.52 | 64.2 |
| eighth surface 142 | flat | infinity | 1.16 | — | — |
| ninth surface 151 | flat | infinity | 0.40 | 1.52 | 64.2 |
| tenth surface 152 | flat | infinity | 0.10 | — | — |
| image surface 16 | flat | infinity | — | — | — |

TABLE 2

| surface | A4 | A6 | A8 | K |
|---|---|---|---|---|
| first surface 111 | −0.0086 | 0.00035 | −0.000008 | 0 |
| second surface 112 | 0.0164 | −0.0032 | −0.0064 | −0.9264 |
| third surface 121 | 0.0397 | −0.0149 | — | −4.1959 |
| fourth surface 122 | 0.0303 | −0.0124 | 0.0072 | −1032.5270 |
| fifth surface 131 | 0.0588 | −0.0456 | 0.0103 | −20.0887 |
| sixth surface 132 | −0.0054 | 0.0157 | −0.0101 | −2.2499 |

TABLE 3

| Z | Y | F1 | F2 |
|---|---|---|---|
| 1.42 mm | 1.41 mm | −1.65 mm | 4.00 mm |

The spherical aberration graph, the field curvature graph, the distortion graph, the relative illumination graph, and the modulation transfer function characteristic curvature graph of the first exemplary embodiment of FIG. 1 are respectively shown in FIGS. 2-6.

Figure 2:
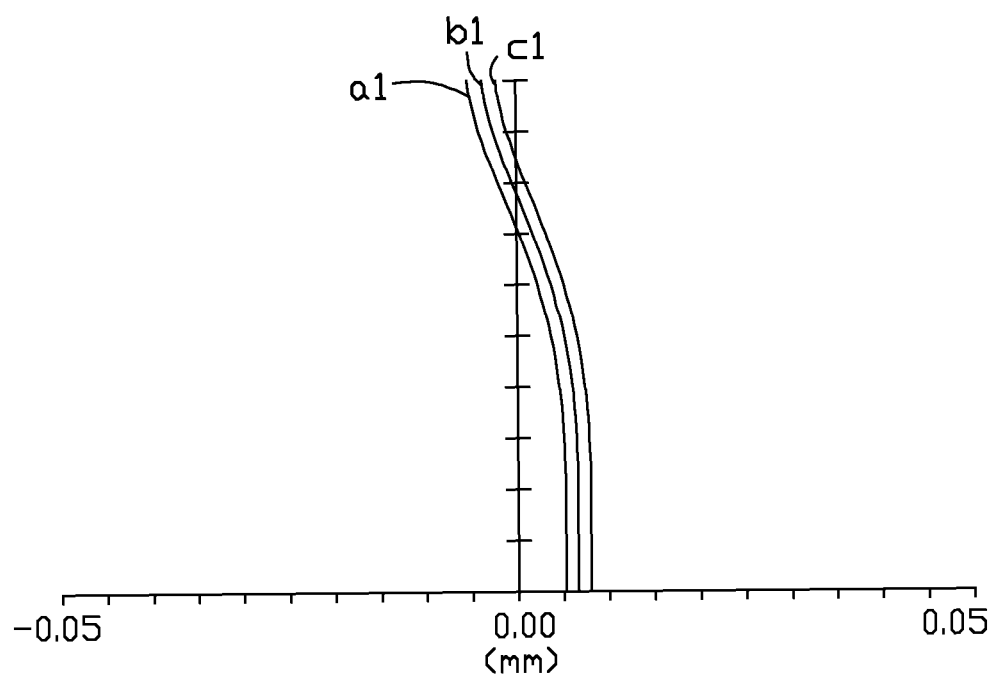
FIGS. 2-6 are graphs respectively showing spherical aberration, field curvature, distortion, relative illumination, modulation transfer function characteristic curvature of the lens system of FIG. 1.

The curves presented in the FIG. 2 are a1 light rays (wavelength: 840 nm), b1 light rays (wavelength: 850 nm), c1 light rays (wavelength: 860 nm). The spherical aberration of visible light in FIG. 2 is limited to a range from −0.05 mm to 0.05 mm.

Figure 3:
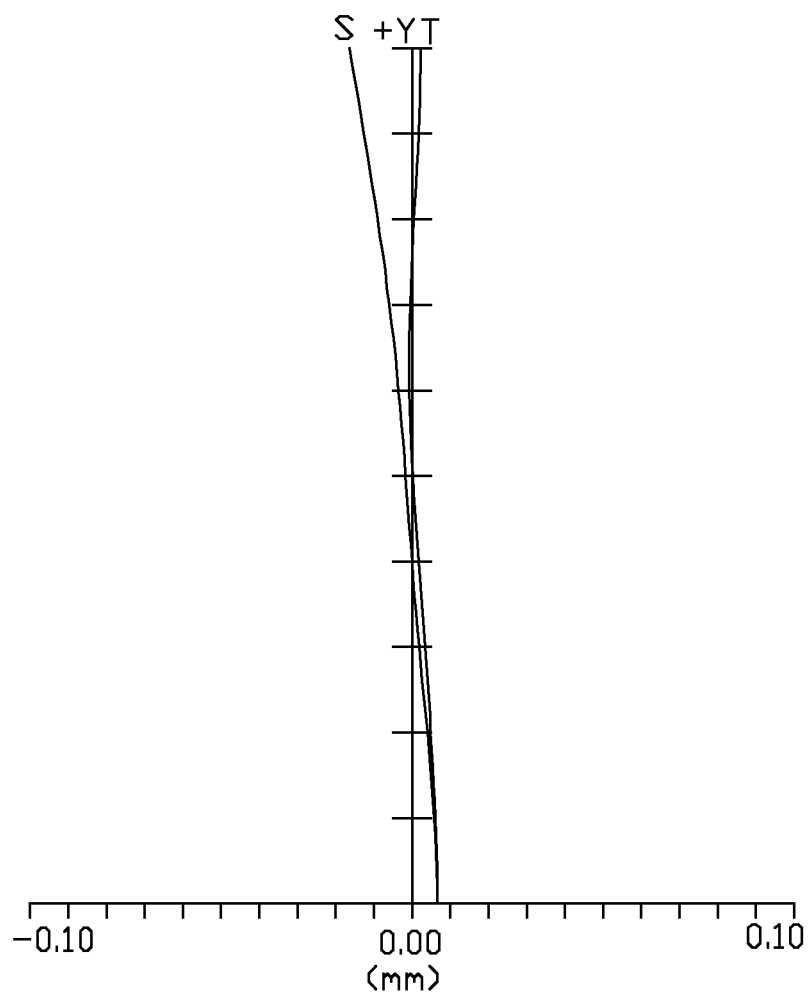
Figure 4:
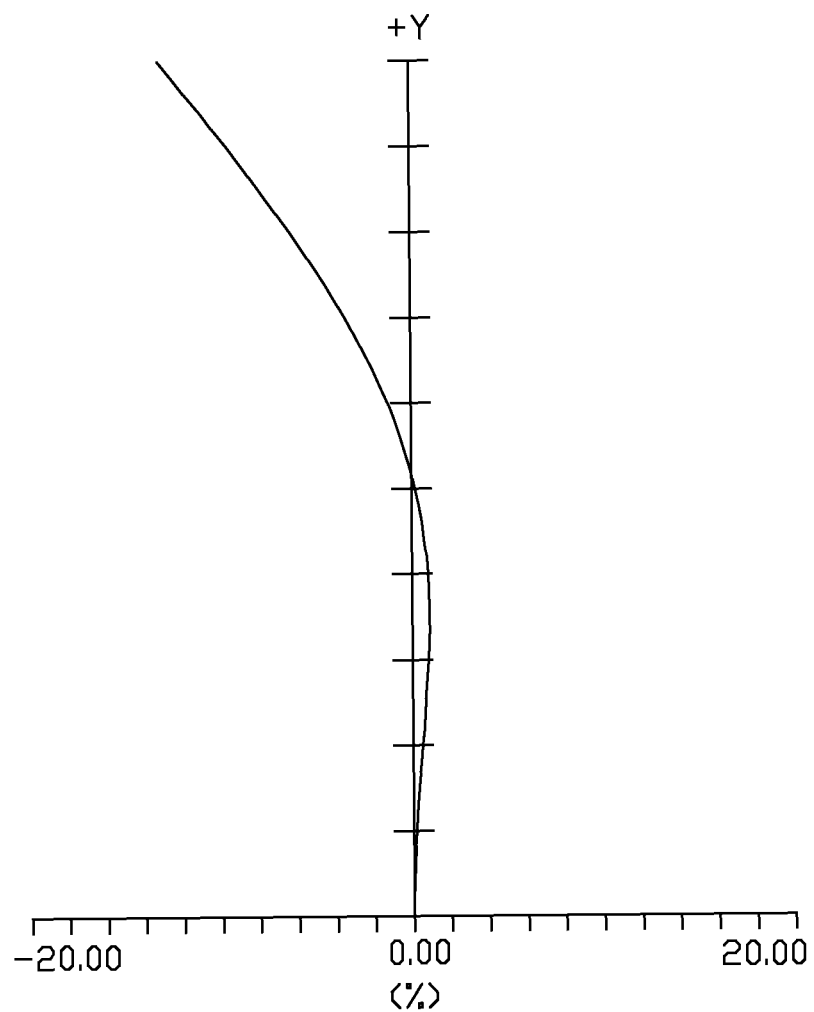
Figure 5:
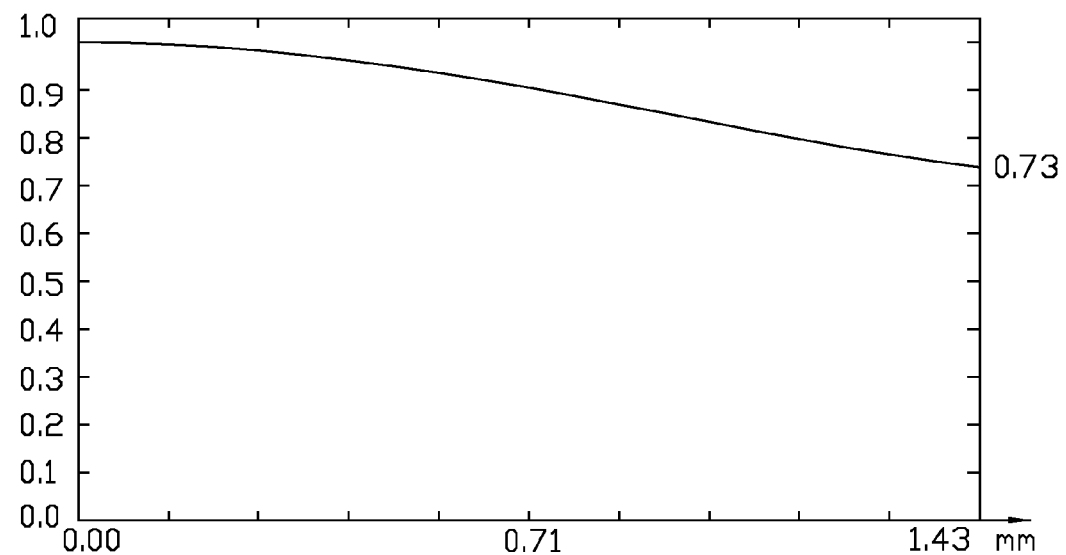

The sagittal field curvature and tangential field curvature shown in FIG. 3 are kept within a range from −0.1 mm to 0.1 mm. The distortion in FIG. 4 falls within a range of about −20% to about 0%. Obviously, the spherical aberration, field curvature, and distortion are well controlled in the lens system 10. In FIG. 5, when the field of view is 1.0 degree and the image height is 1.43 mm, the relative illumination is kept higher than 0.73. Obviously, the relative illumination of the lens system 10 is high.

Figure 6:
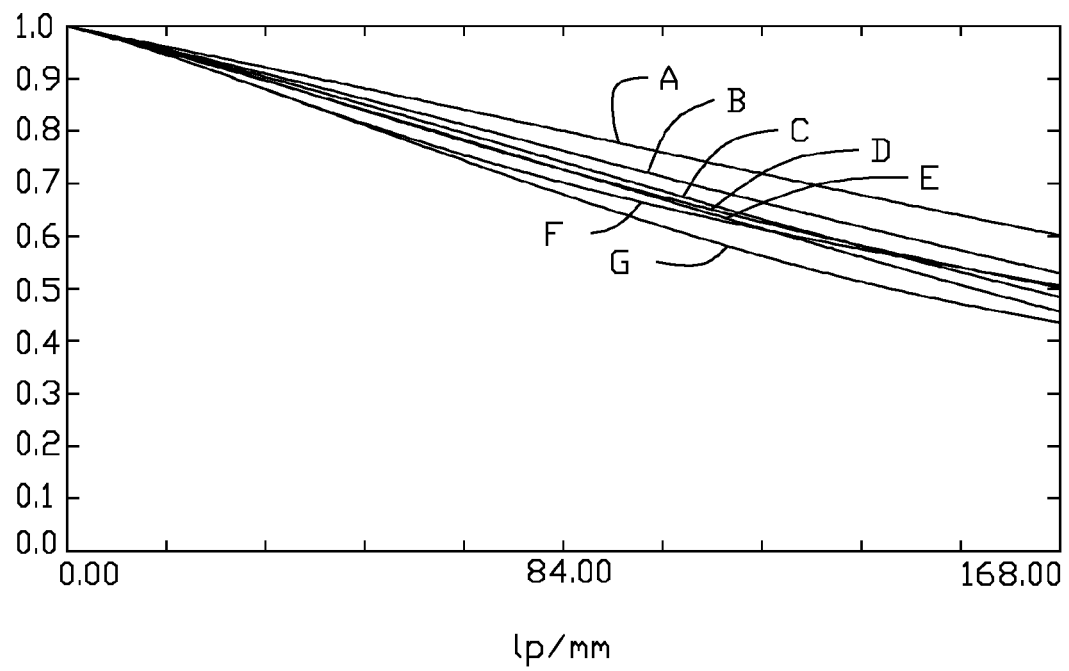

In FIG. 6, under the condition that the Nyquist Frequency is equal to 16811 p/mm, then the value of the Modulation Transfer Function of central field of view is larger than 0.6 (see curve A); the value of the Modulation Transfer Function of the angle of view 0.8 degree is larger than 0.48 (see curves C and E); the value of the Modulation Transfer Function of the field of view between the central field of view and the angle of view 0.8 satisfies the following condition: 0.48<MTF<0.6 (see curves B and D); and the value of the Modulation Transfer Function of the angle of view 1.0 degree is larger than 0.43 (see curves F and G).

A lens system of a second embodiment is similar to the lens system 10 of the first embodiment, except that the lens system of the second embodiment satisfies the parameters of Tables 4-6 instead. The effective focal length of the lens system in the second embodiment is 1.04 mm, the viewing angle of the lens system in the second embodiment is 123.96 degrees, and the aperture of the lens system in the second embodiment is 2.07.

TABLE 4

| Surface | type | R(mm) | D(mm) | Nd | Vd |
|---|---|---|---|---|---|
| object surface | flat | infinity | −111.8 | — | — |
| first surface 111 | aspherical | 9.95 | 1.40 | 1.58 | 29.9 |
| second surface 112 | aspherical | 0.83 | 1.77 | — | — |
| third surface 121 | aspherical | 1.73 | 0.66 | 1.58 | 29.9 |
| fourth surface 122 | aspherical | 6.34 | 0.61 | — | — |
| aperture 17 | flat | infinity | 0.33 | — | — |
| fifth surface 131 | aspherical | 2.47 | 1.08 | 1.58 | 29.9 |
| sixth surface 132 | aspherical | −1.75 | 0.20 | — | — |
| seventh surface 141 | flat | infinity | 0.30 | 1.52 | 64.2 |
| eighth surface 142 | flat | infinity | 0.15 | — | — |
| ninth surface 151 | flat | infinity | 0.40 | 1.52 | 64.2 |
| tenth surface 152 | flat | infinity | 0.10 | — | — |
| image surface 16 | flat | infinity | — | — | — |

TABLE 5

| Surface | A4 | A6 | A8 | K |
|---|---|---|---|---|
| first surface 111 | −0.001 | 0.000014 | −0.00000071 | 0 |
| second surface 112 | 0.2127 | −0.0522 | 0.0199 | −1.7560 |
| third surface 121 | −0.009 | 0.0049 | — | −0.5929 |
| fourth surface 122 | −0.0052 | 0.0101 | −0.0065 | 27.8397 |
| fifth surface 131 | 0.0677 | −0.0345 | 0.0035 | −13.4168 |
| sixth surface 132 | −0.0445 | 0.0540 | −0.0213 | −4.9394 |

TABLE 6

| Z | Y | F1 | F2 |
|---|---|---|---|
| 1.38 mm | 1.34 mm | −1.69 mm | 3.97 mm |

The spherical aberration graph, the field curvature graph, the distortion graph, the relative illumination graph, and the modulation transfer function characteristic curvature graph of the lens system in the second embodiment are respectively shown in FIGS. 7-11.

Figure 7:
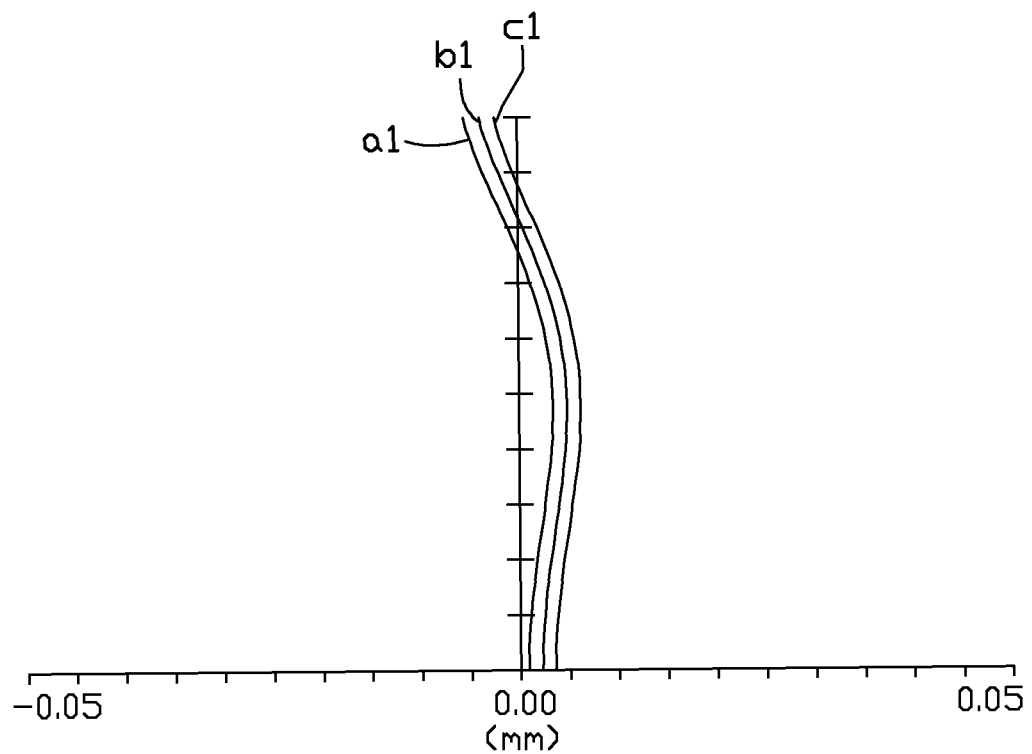
FIGS. 7-11 are graphs respectively showing spherical aberration, field curvature, distortion, relative illumination, modulation transfer function characteristic curvature of a lens system according to a second embodiment.
Figure 8:
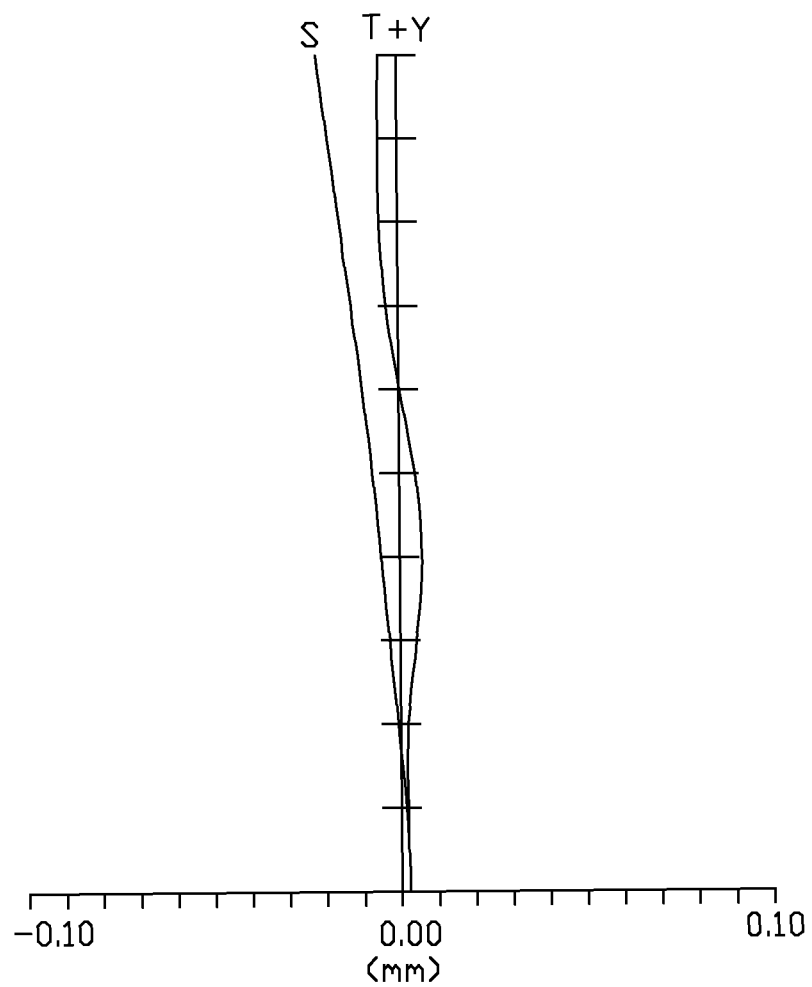
Figure 9:
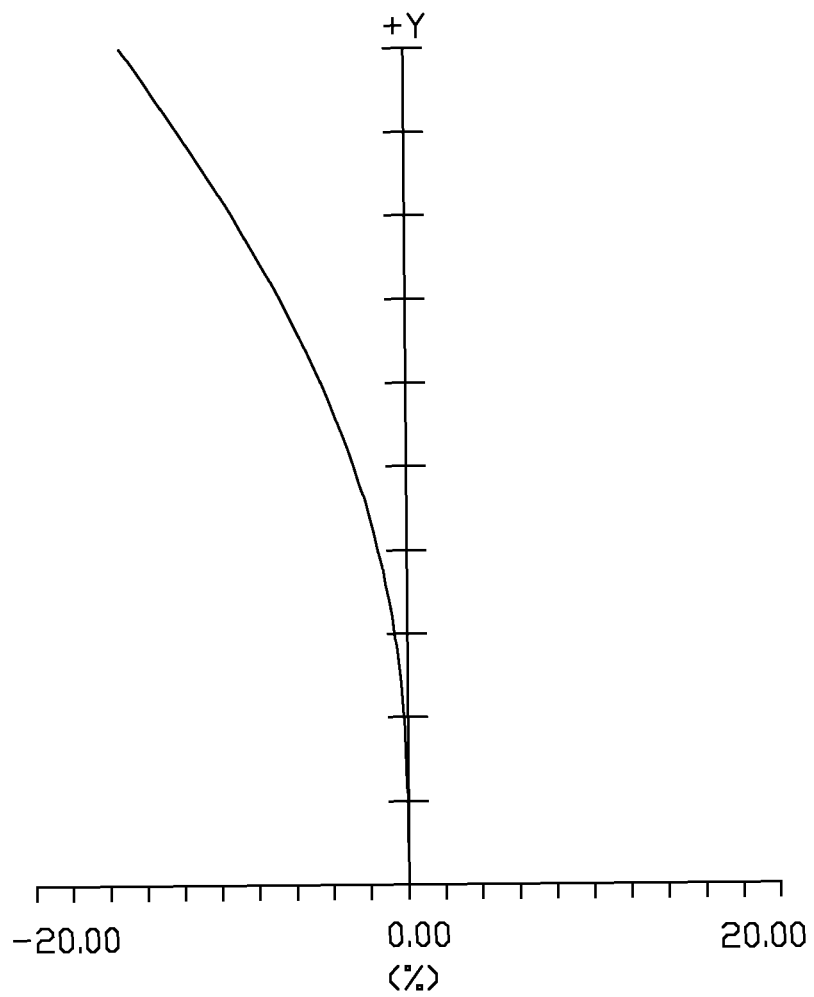

The curves presented in the FIG. 7 are a1 light rays (wavelength: 840 nm), b1 light rays (wavelength: 850 nm), c1 light rays (wavelength: 860 nm). The spherical aberration of visible light in FIG. 7 is limited to a range from −0.05 mm to 0.05 mm. The sagittal field curvature and tangential field curvature shown in FIG. 8 are kept within a range from −0.1 mm to 0.1 mm. The distortion in FIG. 9 falls within a range of −20% to 0%. Obviously, the spherical aberration, field curvature, and distortion are well controlled in the lens system in the second embodiment.

Figure 10:
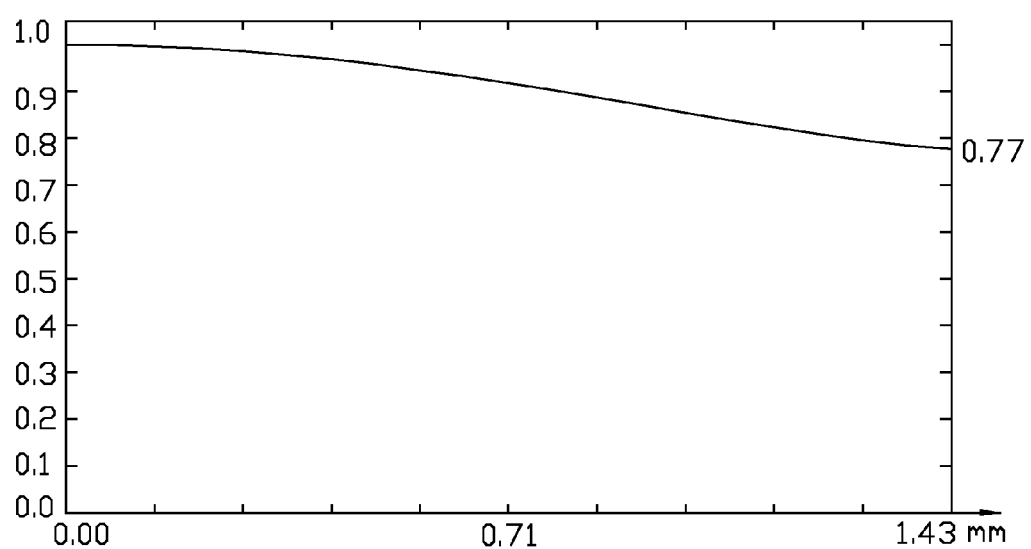

In FIG. 10, when the field of view is 1.0 degree and the image height is 1.43 mm, the relative illumination is kept higher than 0.77. Obviously, the relative illumination is high in the lens system in the second embodiment.

Figure 11:
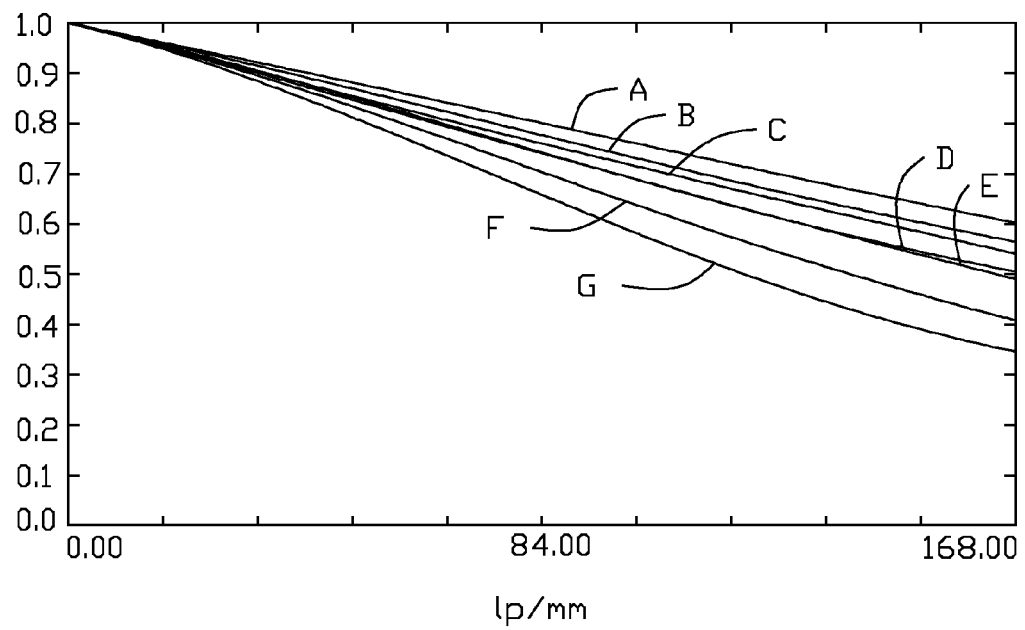

In FIG. 11, under the condition that the Nyquist Frequency is equal to 16811 p/mm, then the value of the Modulation Transfer Function of central field of view is larger than 0.6 (see curve A); the value of the Modulation Transfer Function of the angle of view 0.8 degree is larger than 0.48 (see curves C and E); the value of the Modulation Transfer Function of the field of view between the central field of view and the angle of view 0.8 satisfies the following condition: 0.48<MTF<0.6 (see curves B and D); and the value of the Modulation Transfer Function of the angle of view 1.0 degree is larger than 0.43 (see curves F and G).

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens system for imaging an object at an object side on an imaging surface at an image side, in the order from the object side to the image side, the lens system comprising:
    a first lens with negative refraction power, the first lens comprising a surface facing the image side, the surface facing the image side of the first lens comprising an optical portion;
    a second lens with positive refraction power;
    a third lens with positive refraction power; and
    an imaging plane for forming an image of the object, wherein the lens system satisfies the formulas:

$$Y/Z<1.10; \quad (1)$$

$$G1R1/F1<-3.10; \text{ and} \quad (2)$$

$$G2R2/F2>1.49. \quad (3)$$

wherein Y is a distance between an end point of the optical portion and a center point of the optical portion along a direction perpendicular an optical axis of the lens system, Z is a distance between the end point of the optical portion and the center point of the optical portion along the optical axis of the lens system, G1R1 denotes the radius of curvature of a surface of the first lens which faces the object side, F1 is the focal length of the first lens, and F2 is the focal length of the second lens, G2R2 denotes the radius of curvature of a surface of the second lens which faces the image side.

2. The lens system as claimed in claim 1, wherein the first lens further satisfies the following conditions: G1R2/F1>−0.60, G1R2/F1>G1R1/F1, wherein G1R2 denotes the radius of curvature of the surface of the first lens facing the image side.

3. The lens system as claimed in claim 2, wherein the third lens further satisfies the following conditions: G3R1/F3>1.14, and G3R2/F3<−0.68, wherein G3R1 denotes the radius of curvature of a surface of the third lens facing the object side, G3R2 denotes the radius of curvature of another surface of the third lens facing the image side, and F3 denotes the focal length of the third lens.

4. The lens system as claimed in claim 2, wherein the first lens, the second lens, and the third lens satisfy the following condition: Vd1=Vd2=Vd3<33, wherein Vd1 is the Abbe number of the first lens, Vd2 is the Abbe number of the second lens, and Vd3 is the Abbe number of the third lens.

5. The lens system as claimed in claim 4, wherein the first lens, the second lens, and the third lens are aspherical lenses.

6. The lens system as claimed in claim 1, further comprising an infrared band-pass filter between the third lens and the image plane.

7. The lens system as claimed in claim 6, further comprising a glass plate between the infrared band-pass filter and the image plane.

8. The lens system as claimed in claim 1, wherein Y is equal to 1.41 mm, Z is equal to 1.42 mm, F1 is equal to −1.65 mm, and F2 is equal to 4.00 mm.

9. The lens system as claimed in claim 1, wherein Y is equal to 1.34 mm, Z is equal to 1.38 mm, F1 is equal to −1.69 mm, and F2 is equal to 3.97 mm.

* * * * *